United States Patent [19]

Duncan

[11] Patent Number: 4,825,032
[45] Date of Patent: Apr. 25, 1989

[54] WORKPIECE HANDLING ASSEMBLY
[75] Inventor: Robert Duncan, Fork, S.C.
[73] Assignee: Westinghous Electric Corp., Pittsburgh, Pa.
[21] Appl. No.: 91,472
[22] Filed: Aug. 31, 1987
[51] Int. Cl.⁴ .......................................... B23K 26/00
[52] U.S. Cl. ........................... 219/121.63; 219/121.82
[58] Field of Search ................. 219/121 LC, 121 LD, 219/121 EC, 121 ED, 121 EX, 121 EY, 121 LY, 158, 159, 162, 121 PJ, 121 PK; 376/261

[56] References Cited
U.S. PATENT DOCUMENTS

| | | | |
|---|---|---|---|
| 4,054,772 | 10/1977 | Lichte | 219/121 ED |
| 4,492,844 | 1/1985 | Kobuck et al. | 219/121 LC |
| 4,493,967 | 1/1985 | Wolfe | 219/121 LC |
| 4,501,949 | 2/1985 | Antol et al. | 219/121 LT X |

Primary Examiner—C. L. Albrittion

[57] ABSTRACT

A workpiece handling assembly for supporting and positioning each side of a multi sided workpiece in the path of a welding laser beam. The workpiece handling assembly includes a frame indexably movable in a plane perpendicular to the direction of the welding laser beam. The frame has a central opening therein through which the welding laser beam may be projected. A carrier secures the workpiece so that it is positioned within the frame in a plane in parallel overlying relationship with the aperture. The frame is rotatably supported about a transverse axis parallel to the aperture, the carrier is rotatably supported on the frame about a central axis which is orothogonal to the transverse axis. The workpiece supported in the workpiece handling assembly of the invention is movable through an angle of 360° about the transverse axis and through an angle of 360° about the central axis, so that all sides of the workpiece may be positioned in the path of the laser beam without removing the workpiece from the assembly.

14 Claims, 12 Drawing Sheets

WORKPIECE HANDLING ASSEMBLY

BACKGROUND OF THE INVENTION

This invention relates to an apparatus for use in the welding of a fuel rod grid by laser beam welding. More particularly, the invention relates to a support adapted to indexably position each side of the grid into proper alignment and orientation with the laser beam for welding in one operation.

Nuclear fuel bundle assemblies include a matrix of nuclear fuel rods which are arrayed in rows and columns, and which are held in the desired configuration by a plurality of fuel rod grids. These grids are produced from straps which are linearly extending, generally rectangular elements, characterized by having slots extending from one edge approximately half way through the depth of the strap. The straps are assembled so that each strap is in mating relationship with another strap which is at right angles to the first strap. The slot of one strap engages the other strap at a portion thereof which is in alignment with the slot of the other strap, with the result that the grid is of the same depth as each of the straps which forms the grid. The resulting grid has a first set of straps which are substantially parallel to each other and equally spaced, and a second set of straps which are parallel to each other and equally spaced. The straps of one set are perpendicular to the straps of the other set. All of the aforesaid straps are designed as inner straps and are placed in mating relationship to form a square grid of square cells in rows and columns. In addition, there are provided outer straps which are placed on the four sides of the grid to form a square structure in plan view and a recangular structure in side view.

The utilization of a laser beam to weld grid components is known. Various techniques for aligning, supporting and positioning the straps forming the grid components during laser welding are known, including precisely precisioning each point of intersection or engagement of the grid straps. One such apparatus is disclosed in U.S. Pat. No. 4,492,844 issued to Kobuck et al. on Jan. 8, 1985 and assigned to the assignee herein. In the Kobuck et al. patent, a welding fixture secures the grid straps in the desired configuration of rows and columns described above. The teachings of the Kobuck et al. patent are incorporated herein by reference.

The welding fixture is thereafter secured onto a rotatable support in a welding chamber which itself is indexably movable in a plane perpendicular to the welding laser beam. The welding chamber may be the same type as described in U.S. Pat. No. 4,493,967, issued to Wolfe on Jan. 15, 1985 or U.S. Pat. No. 4,501,949, issued to Antol et al. on Feb. 26, 1985, both of which patents are assigned to the assignee herein. The rotatable support in the welding chamber is mounted for rotation about an axis which is parallel to the plane of motion of the chamber and perpendicular to the direction of the welding laser beam. The arrangements in the Wolfe or Antol et al. patents allow the grid to be movably supported for locating three of the six sides of the grid in the path of the welding laser beam. Thereafter, the welding fixture must be removed from the rotatable support and repositioned thereon in order to allow the remaining three sides of the grid to be positioned in the path of the laser beam for welding. The teachings of the Wolfe patent and the Antol et al. patent are incorporated herein by reference.

Zircaloy is a preferred material for grid fabrication. The material is advantageously and preferably welded in an inert atmosphere confined within the chamber such as described in the Wolfe and Antol et al. patents referred to above. Each time the welding fixture is removed from and repositioned on the rotatable support, the chamber must be opened whereby the inert atmosphere contained therein is disturbed. Thus, removal and repositioning of the welding fixture in the chamber not only requires time and considerable effort, but it also requires that the inert atmosphere within the chamber be replenished and purged of ambient oxygen before welding is resumed, thereby resulting in additional expense and inconvenience.

SUMMARY OF THE INVENTION

The present invention permits a fuel rod grid to be positioned in the path of the laser beam for welding all six sides of the grid without removal of the welding fixture from the rotatable support and repositionment thereon, and further without a significant change in the atmosphere within the welding chamber during the welding operation.

More specifically, the present invention relates to a workpiece handling assembly for supporting and indexably positioning each side of a multi-sided workpiece in the path of a welding laser beam. The workpiece handling assembly includes a frame indexably movable in a plane perpendicular to the direction of the welding laser beam. The frame has a central opening therein through which the welding laser beam may be projected. A carrier secures the workpiece so that is is positioned within the frame in a plane in parallel overlying relationship with the aperture. The frame is rotatably supported about a transverse axis parallel to the aperture. The carrier is rotatably supported on the frame about a central axis which is orthogonal to the transverse axis. The workpiece supported in the workpiece handling assembly of the invention is movable through an angle of 360° about the transverse axis and through an angle of 360° about the central axis, so that all sides of the workpiece may be positioned in the path of the laser beam without removing the workpiece from the assembly.

DESCRIPTION OF THE INVENTION

Figure 1:
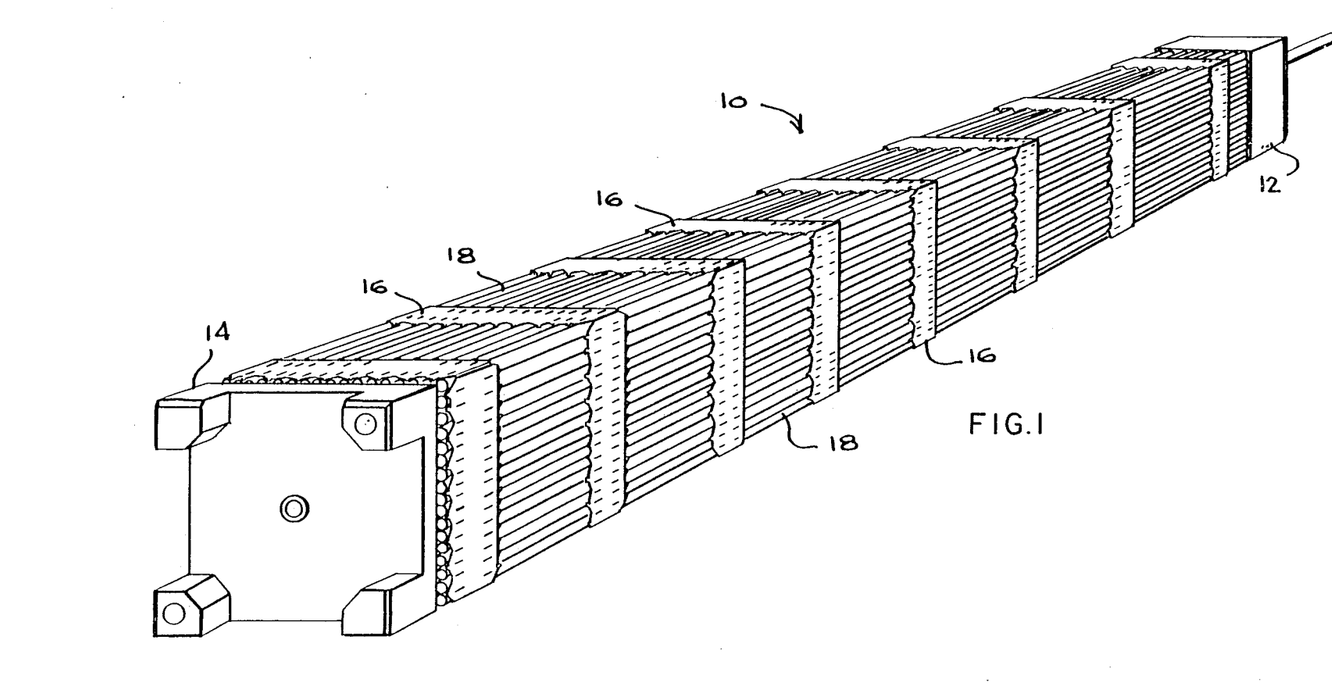
FIG. 1 is a perspective view of a nuclear fuel bundle assembly.

The invention finds particular utility in the manufacture of nuclear fuel bundle assemblies 10 as shown in FIG. 1 of the drawings. The nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Although not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into pre-determined locations within a nuclear reactor, whereby the orientation of the fuel rods 18 with respect to each other is rigorously controlled.

Figure 2A:
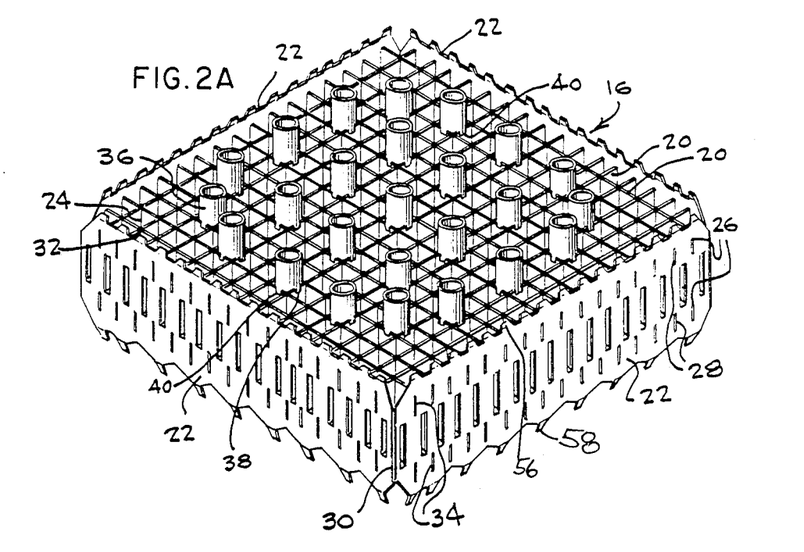
FIG. 2A is a perspective view of a completed grid for use in the nuclear fuel bundle assembly of FIG. 1.

The present invention is, in one illustrative embodiment, related to the manufacture of the fuel rod grids 16, an example of which is shown in FIG. 2A. The fuel rod grid 16 is of an approximately square configuration whose periphery is formed by four outer grid straps 22. Each end of an outer grid strap 22 is welded by a corner seam weld 30 to the end of a perpendicularly disposed outer grid strap 22. Two sets of spaced, parallel inner grid straps 20 are provided, the straps 20 in the sets being perpendicular to eachother, whereby a plurality of cells are formed to receive the control rods (not shown) and the nuclear fuel rods 18 (FIG. 1). The inner grid straps 20 have mating slots 50 (FIG. 2D) thereby providing points 24 of intersection. An intersect weld 32 is formed at each of the points 24 of intersection, whereby a rigid grid structure is formed. Further, each of the inner grid straps 20 includes at each end a pair of tabs 26 of a size and configuration to be tightly received in top and bottom slots 28 in the outer grid straps 22, as shown in FIGS. 2A and 2D. A slot and tab weld 34 (FIG. 2A) is effected along the top and bottom rows of slots 28 in the outer grid straps 22. Further, a plurality of glide sleeves 36 are disposed on the top most surface of the fuel rod grid 16 to receive and guide the control rods disposed therein. A series of seam welds 38 securely attach the guide sleeves 36 to corresponding notches 40 formed within the inner grid straps 20.

A precision laser welding apparatus, such as set forth in the Wolfe or Antol et al. patents noted above, is particularly adapted to perform a series of controlled welding operations whereby each of the welds 30, 32, 34 and 38 is carried out. Such precision laser welding apparatus not only controls the various parameters of the laser beam, such as the width and height of each laser pulse and the number of pulses applied to each weld, but also controls the sequential positioning of the fuel rod grids 16 with respect to the laser beam. After each weld, the fuel rod grid 16 is repositioned and/or the focal point of the laser beam is changed to effect the particular type of weld desired at the next location.

Figure 2B:
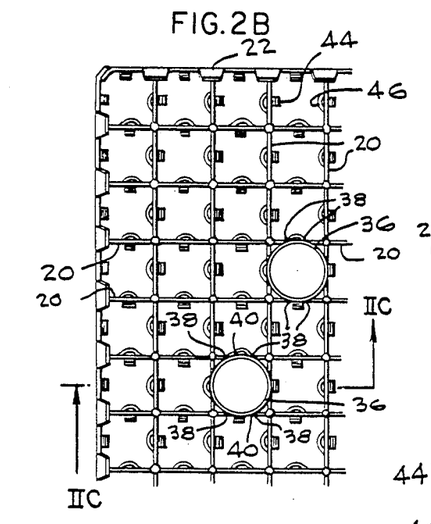
FIG. 2B is a plan view showing a portion of the grid of FIG. 2A.
Figure 2C:
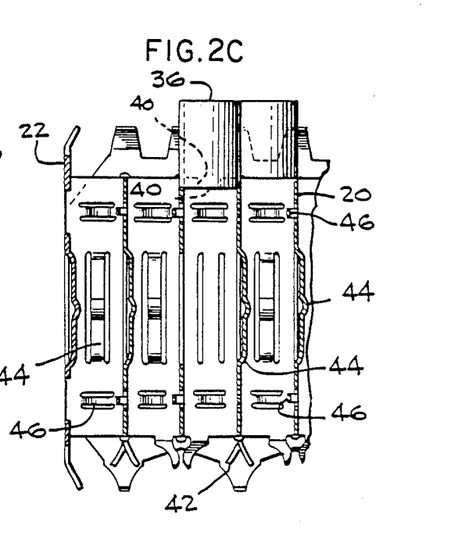
FIG. 2C is a cross sectional view of the grid taken along line IIC—IIC of FIG. 2B.
Figure 2D:
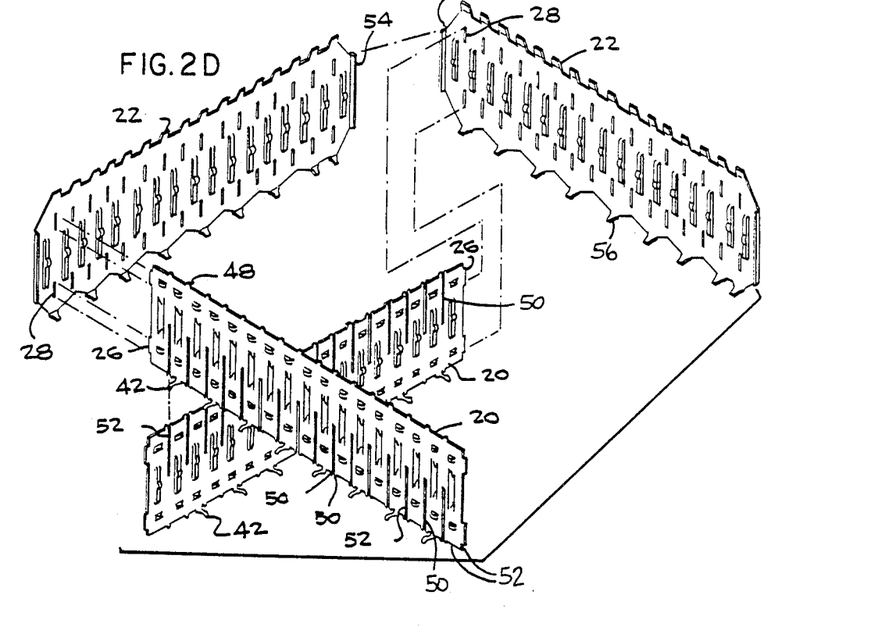
FIG. 2D is an exploded partial perspective view of the grid showing inner and outer grid straps in disassembled relationship.

FIGS. 2B and 2C show a portion of a grid 16, at which two of the sleeves 36 are joined to certain of the inner grid straps 20. FIG. 2C shows that there are provided in each of the cells formed by four intersecting straps, resilient fingers 44 which have been stamped from the material of the straps. Resilient spacing fingers 46 are also provided. In addition, there are provided, at the bottom of the grid 16, vanes 42 which extend from the various straps 20 and 22, and which lie at angles to the planes containing the straps from which they extend (FIG. 2C).

In FIG. 2D, there is shown, in exploded perspective. a selected number of outer grid straps 22 and inner grid straps 20. On either side of the mating slots 50, each inner grid strap 20 has projection tabs 48 along its upper edge and tab portions 52 at its lower edge. Inner grid straps are provided with vanes 42 at their lower edges. At the ends of the inner strap 20, there may be seen the upper and lower tabs 26. Each of the outer grid straps 22 is provided with upper and lower rows of slots 28 for receiving the tabs 26 of the inner straps 20. On one set of parallel inner grid straps 20, the aforementioned mating slots 50 are provided at the upper edge, and it will be understood that in conventional fashion, on the other set of parallel inner grid straps 20 the aforementioned mating slots 50 are provided at the lower edge.

Figure 2E:
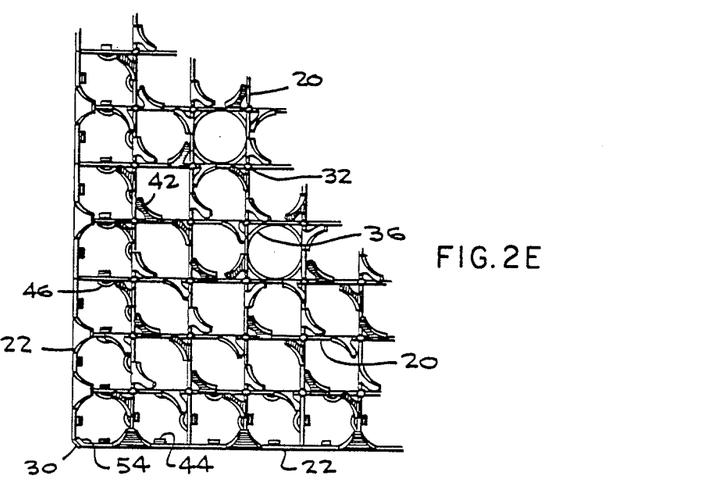
FIG. 2E is a plan view of a portion of the grid, taken from the BOTTOM side of FIG. 2A.

The outer grid straps 22 are provided at their ends with corner tabs 54. In FIG. 2E, these corner tabs 54 are shown in overlapped relationship, and are shown to extend at a 45° angle to the outer grid straps 22 of which they form a part. The outer grid straps 22 have vanes 56 on their lower edges, and vanes 59 on their upper edges. FIG. 2E, similar to FIGS. 2B and 2C, discloses the cells formed by the two sets of parallel straps 20, the straps of one set mating with the straps of the other set and being perpendicular. The vanes 42 extend somewhat across the cells, so as to provide a turbulent flow of water passing through the cells.

Figure 3A:
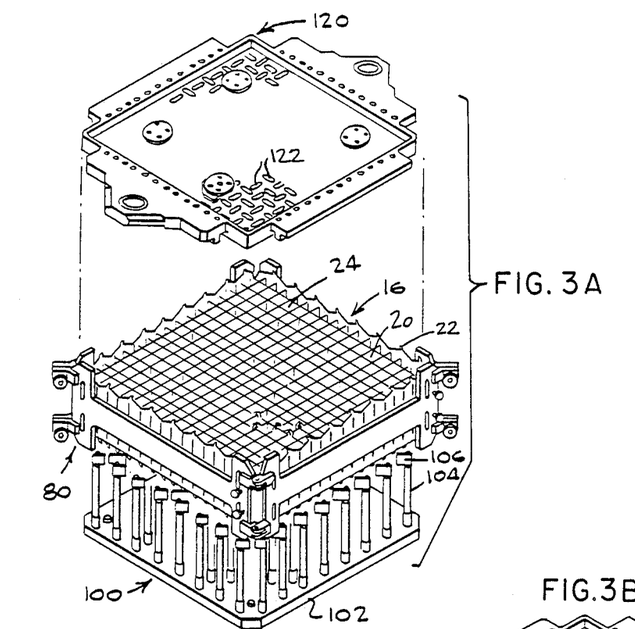
FIG. 3A is an exploded perspective view of a welding fixture and grid assembly.

FIG. 3A shows a grid 16, having a retention strap 80 placed thereon, in position as a unit over a strap and vane positioning fixture 100 comprising a plate 102 and a number of upstanding elements, including rods 104 having spades 106 at their upper ends. The fixture 100 functions in a known manner to deflect vanes 42 and 56, referred to above with respect to FIGS. 2C and 2D, which extend at an angle from the respective straps 20 and 22 forming the grid 16. Also shown in FIG. 3A is a vane side welding plate 120, which is placed on the grid 16 after the vanes of the straps thereof have been deflected by the fixture 100, so as to position the vanes in alignment with openings 122 of the vane side welding plate 120 and to position the upper edges of the straps 20 so that each of the straps is substantially coplanar. The vane side welding plate 120 (FIG. 3A) serves the function of causing the straps 20, 22 to be held more closely in the desired position so that the grid 16 may be welded, with accuracy and rapidity, by suitable welding apparatus, such as a laser welding apparatus. Openings 122 in vane side welding plate 120 provide access for entry of the laser beam to weld the inner straps 20 at each point of intersection 24.

Figures 3B, 3C:
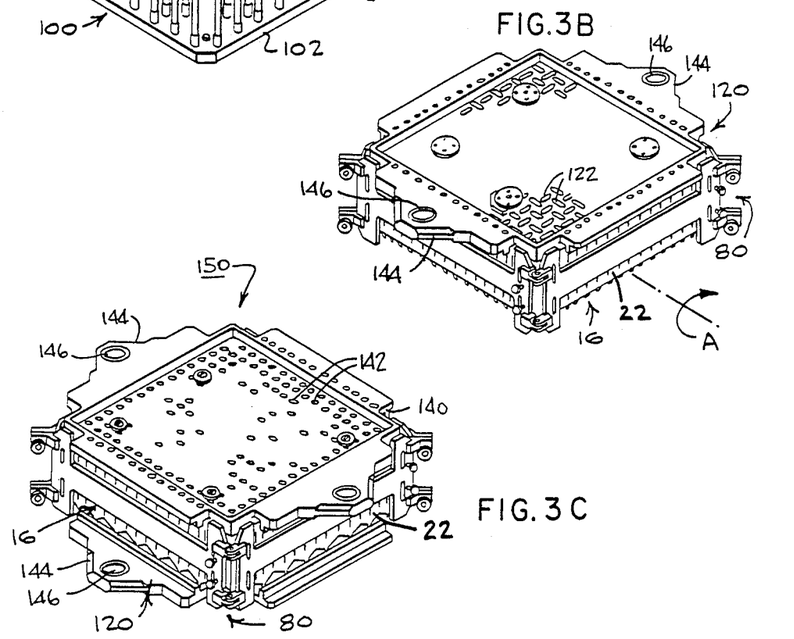
FIG. 3B is a perspective view showing one side of the welding fixture of FIG. 3A.
FIG. 3C is a perspective view showing the welding fixture of FIG. 3A from the opposite side.

In FIG. 3B, there is shown the next step in the processing of the grid 16, in which the vane side welding plate 120 has been positioned on and in engagement with the grid 16. The fixture 100 (shown only in FIG. 3A) is then removed, thereby exposing the side of the grid 16 opposite the vane side, that is, which exposes the side of the grid 16 opposite to that shown in FIG. 3A. Thereafter, the grid 16, retention strap 80, and vane side welding plate 120 are inverted, as by being rotated in the direction indicated by the arrow A in FIG. 3B, to bring the opposite side of grid 16 into the upper position, with the vane side welding plate 120 underneath. Sleeves 36 (FIG. 2A) are located in selected cells in the opposite side of the grid 16. There is then placed on the opposite side of grid 16, which is designated as the sleeve side, a sleeve side welding plate 140 having openings 142. Each welding plate 120 and 140 of the welding fixture 150 has opposed apertured extensions 144, each with an aperture 146.

With the completed assembly of a welding fixture 150 as shown in FIG. 3C, the next step is the welding of the grid 16, as by laser beam welding. This includes, broadly, the welding of the points of intersection 24 on each side of the grid 16, the welding of the corners 30 of the grid 16, the welding of tabs 26 of the straps 20 of the grid 16 where they extend into slots 28 in outer straps 22, and performing seam welds 38.

Referring to FIGS. 4–9, there is shown a welding chamber 160, similar in construction to the chamber disclosed, for example, in the Wolfe or Antol et al. patents noted above. The chamber 160 is fragmented to show interior structures and is generally formed by upstanding side walls 162, a top (not shown) having a laser beam aperture and a base member 168.

A paddle assembly 180 includes a frame 182 having an aperture or opening 184 therein. The frame 182 has extending therefrom upstanding cylindrical side wall 186 and a pair of respective diametric right and left shaft members 188R and 188L lying on a horizontal axis Y. The shaft members 188R and 188L are rotatably supported in bearing members 190 which are mounted within openings 192 in the opposing pair of side walls 162 of the welding chamber 160 as shown. A first drive mechanism 194 is secured to the base 168 of the chamber 160 as shown (FIGS. 5 and 6) and is coupled to the right shaft member 188R for indexably driving the paddle assembly 180 to any desired angular position within a range of 360° about the Y axis. The first drive mechanism 194 may be a DC servo motor such as a model GR6 manufactured by Anorad Corp., Hauppauge, N.Y. Such a device is capable of positioning the paddle assembly to an accuracy of 0.036°.

Figure 4:
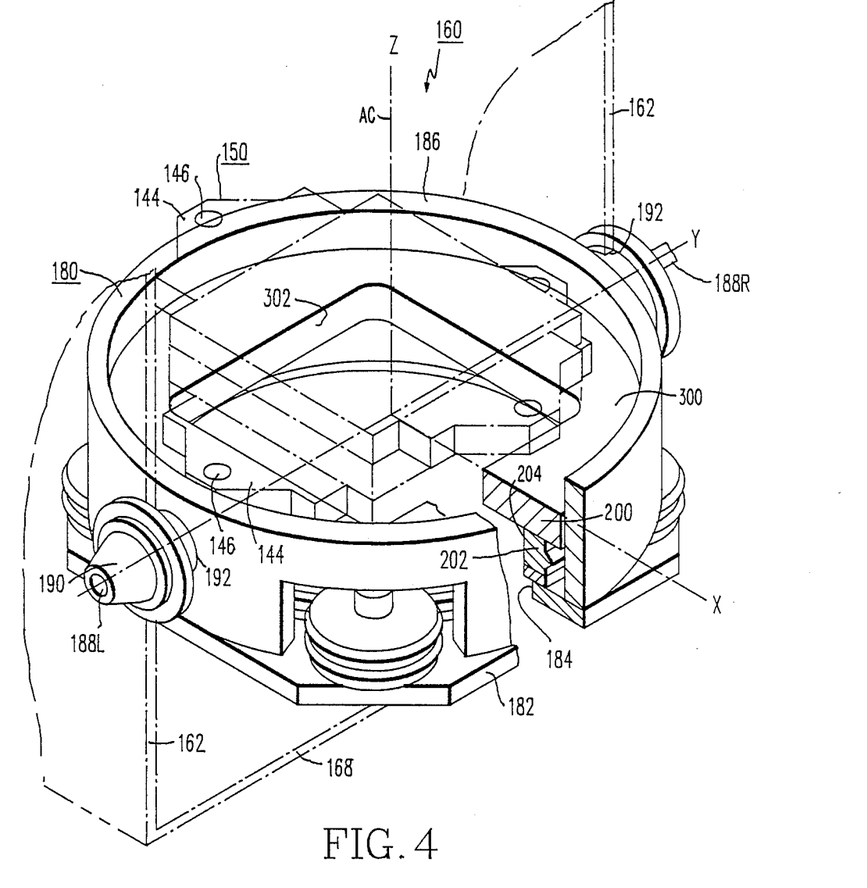
FIG. 4 is a perspective view of an apertured frame and carrier located within a welding chamber, portions of which have been removed for purposes of explanation shown supporting a welding fixture grid illustrated schematically in phantom lines.

A carrier 200 is rotatably secured above the apertured frame 182 for rotation about a central axis AC perpendicular to a plane including the aperture 184 of the frame 180 and the transverse axis Y. When the aperture 184 of the frame 180 is in the horizontal XY plane, the central axis AC lies along the Z axis as shown in FIG. 4. When the aperture 184 of the frame is in the verical YZ plane, the central axis AC lies along the X axis. For purposes of explaination, in some instances rotation of the carrier 200 will be described as occuring about the X axis or the Z axis. However, it is to be understood that the central axis AC may be positioned through a range of 360° about the Y axis.

As shown in FIG. 4, the central axis AC is concentric with respect to the aperture 184 in the frame 182. The carrier 200 has depending cylindrical wall 202 and a central opening 204 therein which likewise is concentric with the central axis AC and the aperture 184 in the frame 180.

Figure 5:
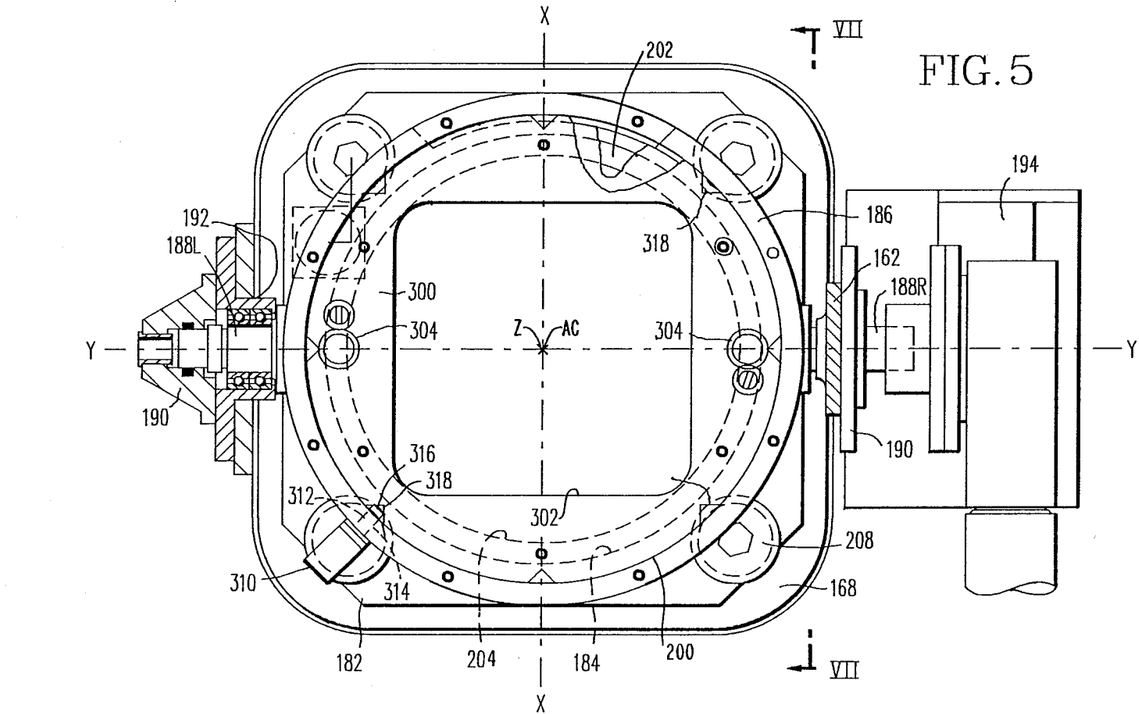
FIG. 5 is a top view of the frame and carrier illustrated in FIG. 4.
Figure 8:
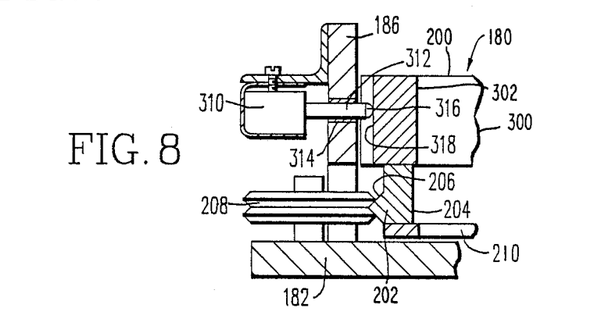
FIG. 8 is a detailed view of a carrier support.
Figure 9:
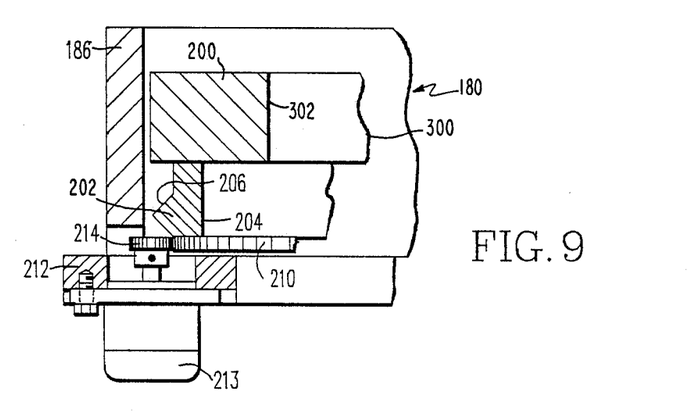
FIG. 9 is a detailed view of a carrier drive.

As best seen in FIG. 8, a lower end of the depending cylindrical wall 202 of the carrier 200 has a circumferential outwardly tapered bearing 206. Four circumferentially located, inwardly tapered bearing rollers 208 are mounted to the frame 182 on vertical axes and at 90° intervals as shown in FIG. 5. The inwardly tapered bearing rollers 208 radially engage the circumferential, outwardly tapered bearing 206 (FIGS. 4, 5 and 8) to rotatably support the welding fixture carrier 200 within the paddle 180 as shown. A lower end of the depending wall 202 further includes a circumferential spur gear 210 formed below the circumferential outwardly tapered bearing 206 (FIG. 9). A second drive mechanism 212 (FIG. 5) including a stepping motor 213 and pinion gear 214 engages the spur gear 210 and is adapted to rotate the carrier 200 to any desired angular position within a range of 360° about the central axis AC (FIG. 4).

Figure 6:
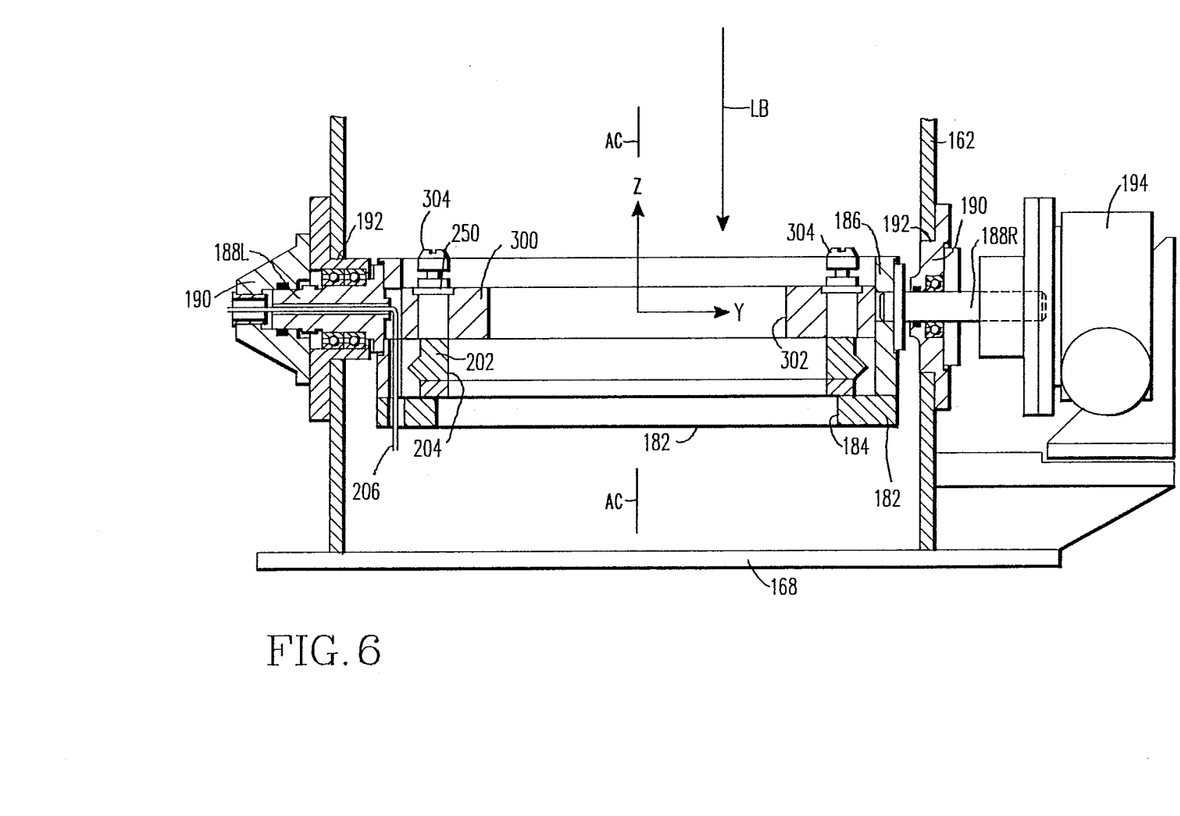
FIG. 6 is a side view of the frame and carrier illustrated in FIG. 4.
Figure 7:
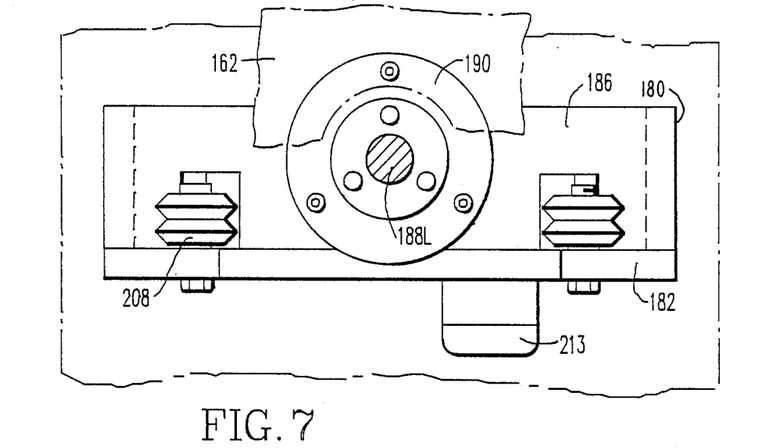
FIG. 7 is an end view of the frame and carrier illustrated in FIG. 4.

An upper frame member 300 is mounted to an upper portion of depending cylindrical wall 202 (FIGS. 5 and 6). The upper frame member 300 has a square opening 302 therein which is concentric with the frame aperture 184 along the Z axis. The opening 302 corresponds in size and shape to that of the grid 16 described above.

Solenoid 310 is mounted to upstanding wall 186 (FIG. 8). The solenoid 310 has a spring biased core 312 which is adapted to move radially with respect to the wall 186 and carrier 200. The wall 186 has a radial through hole 314 aligned with and sized to receive the core 312. Normally the solenoid 310 is de-energized and the core 312 is extended as shown in FIG. 8 under the influence of a spring (not shown). The free end of the core has a tapered point 316. The upper frame member 300 of the carrier 200 has a number of vertically aligned notches 318 (FIG. 8) at certain usefully spaced circumferential positions as shown in FIG. 5. Normally the point 316 of core 312 is located at rest in one of the notches 318 whereby the carrier 200 may be locked in position. When the solenoid 310 is activated, the core 312 moves radially outward with respect to the carrier 200 and withdraws from the notch 318 whereby the carrier 200 is unlocked.

It should be understood that the second drive mechanism 212 may be activated to rotate the carrier 200 to any angular position within a range of 360° about the central axis AC as shown, for example, in FIGS. 4–6. However, certain angular positions have particular advantage and the notches 318 are positioned to allow the carrier to be indexably positioned and conveniently locked at such positions. When it is desired to unlock the carrier 200, the solenoid 310 is momentarily activated, the core 312 moves radially outward with respect to the carrier 200 and the point 316 withdraws from the notch 318. The carrier 200 may thereafter be driven by stepping motor 213 to various angular positions about the Z axis (or the X axis as hereinafter described) and stopped. If the solenoid 312 is de-energized, the point 316 will move into the next following notch 318 and thereby lock the carrier 200. It is, of course, possible to hold solenoid 310 energized for a time sufficient to bring the carrier 200 to any desired position, including positions between any two notches 318. A suitable interlock (not shown but known to those skilled in the art) between solenoid 310 and stepping motor 213 may be provided to avoid operating the steppng motor 213 when the lock is engaged.

In the embodiment shown, for convenience, notches 318 may be placed at 90° intervals and in some applications at 45° intervals. Other positions may be provided, if desired, and the invention is not limited to the positions shown. Preferably, however, in the application described hereinafter, during laser welding the relative position of the grid 16 with respect to the welding laser beam LB is such that at least one side of the grid 16 is perpendicular to the transverse axis Y and one side is parallel to said Y axis. Notches 318 are thus provided at 90° increments to indexably position and lock the grid 16 as desired. In another application, outer grid straps 22 are disposed 45° with respect to the Y axis and notches 318 are provided at 45° intervals.

Welding fixture hold-downs 304 are adapted to engage openings or apertures 146 in apertured extensions 144 of the welding fixture 150 (FIGS. 3B-3C and FIG. 4) so that when installed onto the paddle structure 180 as illustrated in FIG. 4, portions of the grid 16 which are to be welded will be located by the welding fixture 150 concentrically at least within the confines of the aperture 302 of the upper frame member 300 and in an overlying plane parallel to the Y axis.

In operation, the chamber 160 is indexably movable in the X-Y direction (FIG. 4) in accordance with the teachings of Wolfe and Antol et al. The indexable movement of the chamber 160 is at least co-extensive with the boundaries of the aperture 302 in the upper frame member 300. Any point within the square (FIG. 5) defined by the aperture 302 in the upper frame member 300 may be indexably addressed by the laser beam LB which is directed into the chamber 160 along the Z axis as shown in FIGS. 4 and 6. Thus, the laser beam LB may weld any one of the grid strap intersections 24, tab 26 and sleeve 28 locations 38 hereinbefore described (FIGS. 2A-2D).

In accordance with the invention, the paddle 180 and welding fixture 150 mounted thereon (FIG. 4) may be rotated about the Y axis through 360° by means of drive 194 (FIG. 5). When rotated 90° from the horizontal position, two of the four outer strap members 22 (FIG. 2A) will be positioned in the XY or horizontal plane and the square or large sides of the grid 16 will lie in the YZ or vertical plane. (See, for example, sides B and C in FIG. 10B). Any point on the surface of the upper most outer grid strap 22 may then be addressed by the laser beam LB as the chamber 160 is incrementally indexed in the XY directions. Of course, in accordance with the present invention, the lowermost one of the outer grid straps 22 may be rotated into the upper position by rotating the paddle 180° about the Y axis, or by rotating the carrier 200 about the central axis AC through an angle of 180° (see FIG. 10C, where the central axis AC lies along the X axis).

Further in accordance with the present invention, the paddle 180 may be utilized to indexably rotate the welding fixture 150 so that sides of the grid 16 perpendicular to the sides described immediately above may be moved into the horizontal plane in the path of the laser beam LB. For example, the welding fixture 150 and the grid 16 carried thereby (Figure 4) may be rotated 90° about the Z axis and then 90° about the Y axis to place the adjacent pair of opposing outer grid straps 22, in spaced horizontal planes (see, for example, sides E and F in FIGS. 10F and 10G). Each of the outer grid straps 22 may be rotated into the uppermost horizontal position, so that it may be addressed by the laser beam LB, by rotating the frame about the Y axis through an angle of 180° (or by rotating the carrier 200 through an angle of 180° about the central axis AC, which corresponds to the X axis in FIGS. 10F and 10G).

Figure 10A:
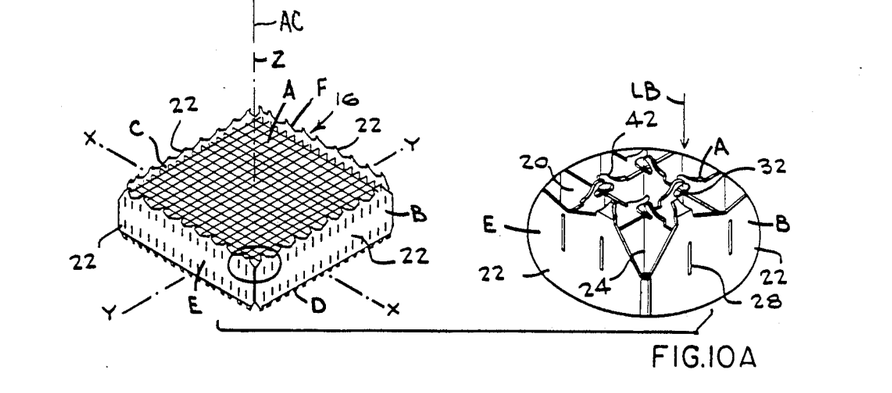
FIGS. 10A–10H show, in a series of perspective views with enlarged inserts, the sequence of steps for welding the grid using the frame and carrier of the present invention.

For a detailed explanation of the various desired orientations of the grid 16 made possible by the present invention, reference is directed to FIGS. 10A-10H. In FIG. 10A the grid 16 is shown in perspective lying in the horizontal or XY plane. The welding fixture 150 shown in FIGS. 3C and 4 and the paddle 180 illustrated in FIGS. 5-9 are not shown in FIGS. 10A-10H, although each will be referred to as necessary in order to explain the movements of the grid 16 in FIGS. 10A-10H. It is understood that the grid 16 is moved into each of the orientations described in FIGS. 10A-10H by appropriate movement of apertured frame 182 about the Y axis and movement of carrier 200 about the central axis AC. In some of the figures the central axis AC lies along the Z axis or the X axis depending on the orientation of the frame 180 about the Y axis.

Referring to FIG. 10A as a starting point, the sides of the grid 16 shall be referred to hereinafter as follows. The upper square surface is side A; the lower square surface hidden in FIG. 10A is side D; rectangular sides B and C oppose each other; and rectangular sides E and F likewise oppose each other and are perpendicular to the rectangular sides B and C.

In accordance with the invention, when the grid 16 is in the position shown in FIG. 10A the welding chamber 160 (FIG. 4) may be indexed in the XY plane to position the grid 16 with respect to the welding laser beam LB in order to facilitate welding intersections 24 in the side A of the grid straps 20 as shown in the insert to the right of the grid 16 illustrated.

Figure 10B:
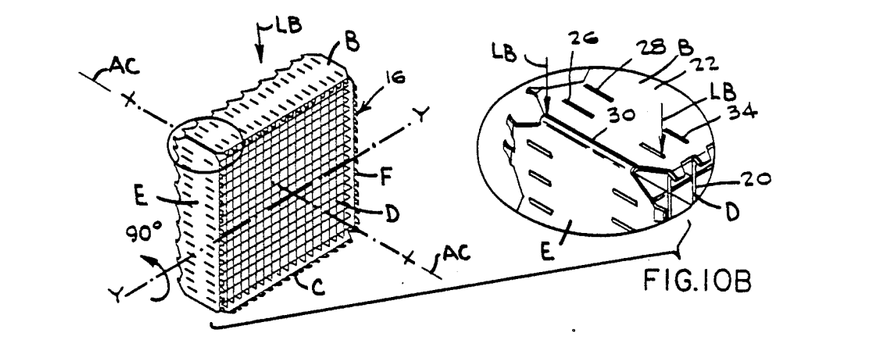

When the welds are performed in the upper side A of the grid 16, the frame 180, and thus the grid 16 carried thereby in welding fixture 150 (FIG. 4) may be rotated from its position in FIG. 10A about the Y axis and angle of 90° so that the outer grid strap 22 (side B) is rotated in the uppermost horizontal plane and is addressed by the laser beam LB operating along the Z axis (FIG. 10B). Thus, intersections at which the inner grid straps 20 tabs 26 engage slots 28 in the outer grid strap 22 (detailed in the insert in FIG. 10B) may be addressed and welded by means of the laser LB. Also, corner welds 30 may be made.

Figure 10C:
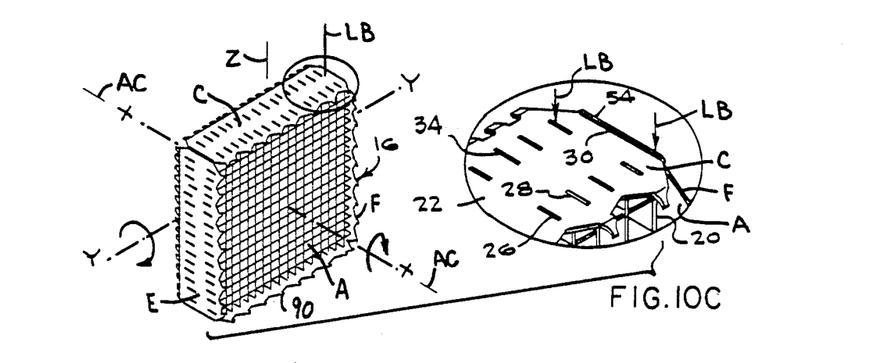

In FIG. 10C, the grid 16 is shown having been rotated 180° (by rotation of the frame 180) about the Y axis from its position in FIG. 10B. Thus, the outer grid strap 22 at side C is now in the upper horizontal plane and is addressable by the laser beam LB. Welds similar to those described with respect to FIG. 10B may be made.

With prior devices removal and reposionment of the welding fixture would be necessary after only welding sides A,B and C.

Figure 10D:
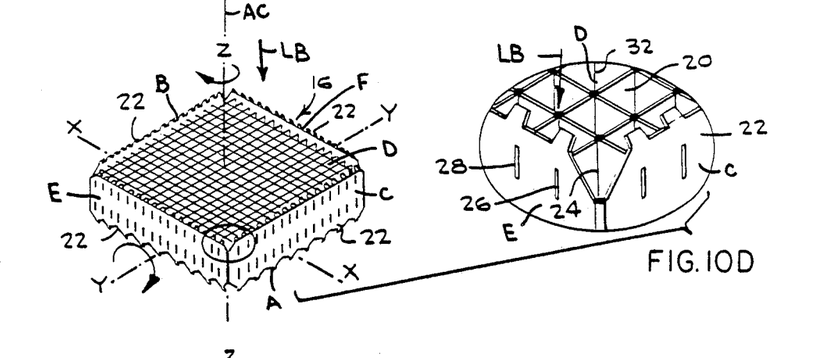

In the present invention, the paddle 180 has the aperture 184 in the frame 182 which allows the paddle 180 to be inverted for welding side D through the aperture 184, without removing and repositioning the welding fixture 150 on the paddle 160 and without purging the chamber 160. In FIG. 10D the grid 16 is shown as having been rotated through and angle of 90° about the axis Y from its position in FIG. 10C so that side D is addressable by the laser beam LB for making intersection welds at intersections 24 shown in the insert.

Figure 10E:
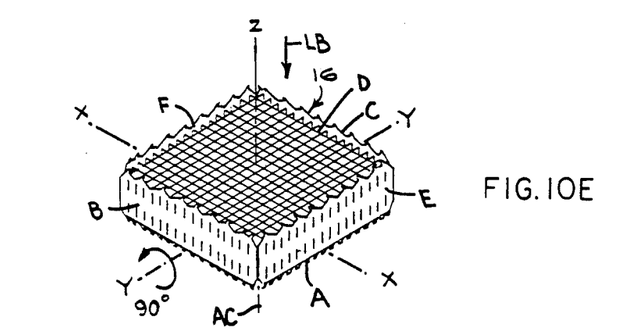
Figure 10F:
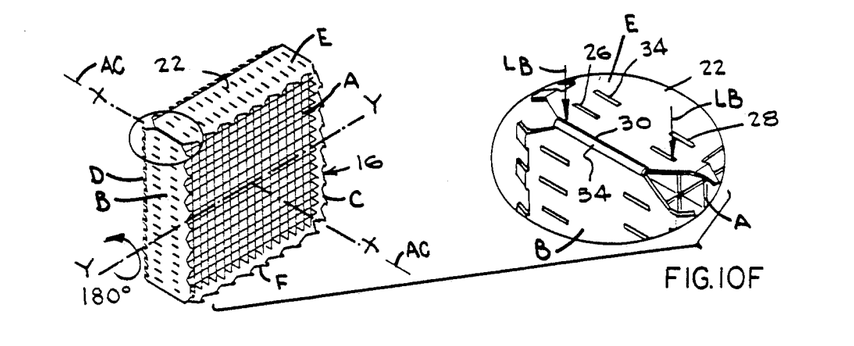

At this point, but for the additional feature of the rotatable carrier 200, it would be necessary to remove and reposition the welding fixture 150 on a paddle not equipped with such carrier 200. However, the carrier 200 permits rotation of the welding fixture 150 relative to the paddle 180. In FIG. 10E the grid 16 is shown as having been rotated through an angle of 90° about the central axis AC from its position in FIG. 10D by means of corresponding rotation of the carrier 200 (FIG. 4) so that the outer grid straps E and F are parallel with the Y axis. This rotation is in preparation for further rotation of the grid 16 into the orientation illustrated in FIG. 10F. In FIG. 10F, the grid 16 has been rotated about the Y axis through an angle of 90° from its position in FIG. 10E so that the outer grid strap 22 at side E is in the upper horizontal plane and is addressable for welding by the laser beam LB as hereinbefore described and as shown in the insert.

Figure 10G:
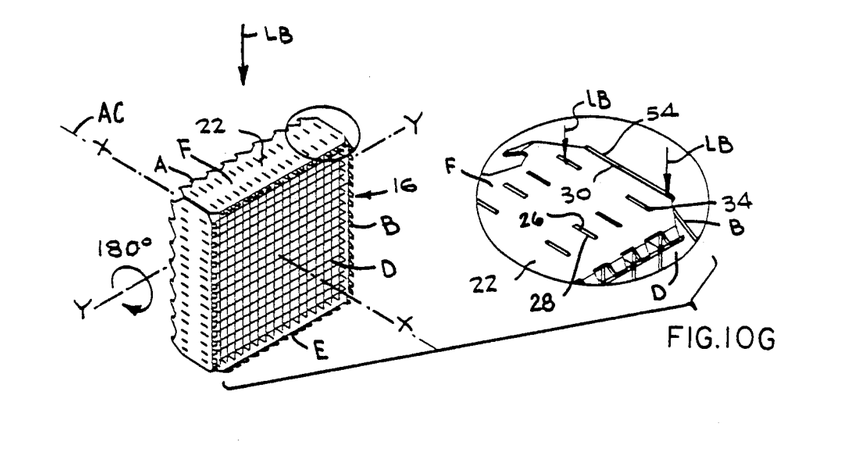

In FIG. 10G, the grid 16 is shown as having been rotated abult the Y axis through an angle of 180° so that the outer grid strap 22 at side F is located in the upper horizontal plane for addressable welding of the tabs 26 and corners 30 by the laser beam LB.

Figure 10H:
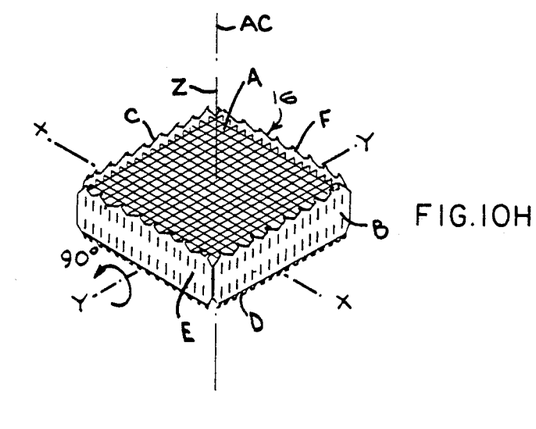

In FIG. 10H, the grid 16 is shown as having been returned to the original or starting position of FIG. 10A by rotating the grid 16 about the Y axis through an angle of 90°, and then rotating the gred 11 about the central axis AC through an angle of 90° from the position in FIG. 10G. At this point the grid 16, having been welded in all six sides A-F, may be removed from the paddle 180 and chamber 160.

In accordance with the invention, rotations of the grid 16 about the Y axis are easily accomplished by driving the frame 180 by means of the drive mechanism 194. Rotations of the grid 16 about the X and Z axes are accomplished by the rotation of the carrier 200 by means of drive mechanism 212.

Because of the improvements provided by the arrangement described herein, it is possible to load the welding fixture 150 onto the paddle 180 and effect weldments on each of the six sides A-F by simple rotational movements of the paddle 180 about the Y axis and rotational movements of the carrier about the X and Z axis. Welding in all sides A-F is accomplished without removing the welding fixture 150 from the chamber 160 and without reorienting the welding fixture 150 in the paddle 180 as in prior arrangements. Thus, it becomes unnecessary to purge the welding chamber 160 and the grid 16 is welded more rapidly and at lower cost. Further, the risk of damaging the grid 16 by manual reorientation during repositioning of the welding fixture 180 is reduced as a result of the present invention.

Figure 11:
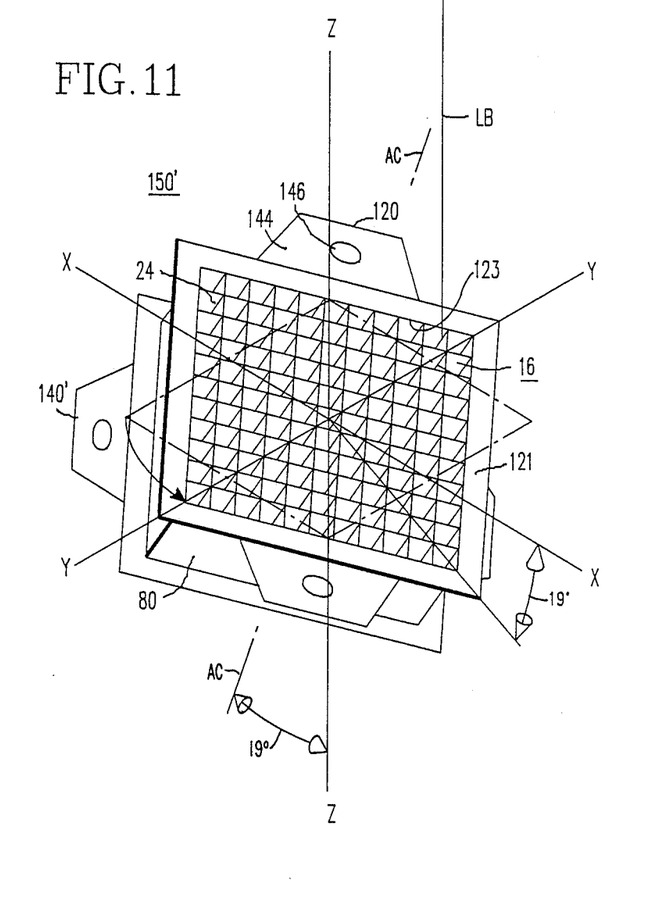
FIG. 11 is a schematic representation in perspective of a modified welding fixture welding inside grid seams.

In certain applications, more extensive welding of the grid 16 is required, for example, full lengthwise welds along grid intersections 24. If desired, such full lengthwise welding of grid intersections 24 may be made using the apparatus of the present invention. In order to accomplish this it is necessary to remove the welding fixture 150 (FIG. 3C) from the chamber 160 and remove from the fixture 150 the grid 16 which has been welded as hereinabove described. The grid 16 is then placed in an open welding fixture 150' (FIG. 11). The open welding fixture 150' is similar to the welding fixture 150 shown in FIGS. 3B and 3D, and similar elements have the same reference numerals. For example, the retention strap 80 is the same. However, modified vane side welding plate 120' and modified sleeve side welding plate 140' each have an apertured grid edge retaining frame portion 121 which has an open area 123. Such an open area 123 allows access by the laser beam LB to the intersections 24 in each cell. In such an arrangement, the described modified welding fixture 150' is placed on the paddle assembly 180 (FIG. 4) and the carrier 200 rotated about the central axis AC so that sides A, B, C and D lie at a 45° angle relative to the Z axis. Thereafter, the frame 180 carrying welding fixture 150 may be rotated about the Y axis about 19° from the horizontal, thereby exposing the intersections 24 lengthwise to the laser beam LB as shown in FIG. 11. Thus, the availability of notches 318 at 45° intervals facilitates a rapid orientation of the grid 16 for lengthwise cell intersection welding. It should be understood that to effect full lengthwise intersection welds in each of the cells, further rotations of the modified welding fixture 150' about the central axis AC and about the Y axis may be necessary. However, further explanation is deemed unnecessary in view of the previous descriptions herein.

The additional welding step described for lengthwise intersection welding is necessary for certain grid designs. The requirement to remove and change the welding fixture 150 is only necessary because of limitations of currently available welding fixture designs. With a more versatile welding fixture design, removal of the welding fixture for full intersection welding may not be necessary. It is important to note that welds of a particular type may be effected for all sides of the grid using the apparatus of the present invention, without removing the grid from the chamber 160, notwithstanding the limitations of available welding fixtures.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A workpiece handling assembly for movably positioning each side of a multi-sided workpiece in the path of a welding laser beam, comprising:
    a frame movable in a plane perpendicular to the direction of the welding laser beam, said frame having a central opening therein through which the welding laser beam may be projected;
    a carrier rotatably mounted on the frame for securing the workpiece within the frame in a plane in parallel overlying relationship with the frame;
    the frame being rotatably supported about a transverse axis parallel to the opening, and the carrier being rotatably supported on the frame about a central axis orthogonal to the transverse axis; and
    the workpiece being movable through an angle of 360° about the transverse axis and through an angle of 360° about the central axis, so that all sides of the workpiece are movable into the path of the welding laser beam without removing the workpice from the assembly.

2. A workpice handling assembly for supporting and indexably positioning each side of a multi-sided workpiece in the path of a welding laser beam comprising:
    a frame having a central aperture therein through which the laser beam may be projected, said frame being indexably movable relative to the welding laser beam in a plane perpendicular to the direction of said welding laser beam at least to the extent of boundaries of said aperture;

a carrier rotatably mounted on the frame for supporting the workpiece in a plane in parallel overlying relationship relative to the frame;

the frame being rotatably movable through an angle of 360° about a transverse axis parallel to the aperture and the carrier being rotatably movable through an angle of 360° about an axis concentric with the aperture of the frame and the carrier and orthogonal to the transverse axis, whereby the workpiece is movable through an angle of 360° in orthogonal planes and indexable relative to the welding laser beam so that all sides of the workpiece may be positioned in the path of the welding laser beam without removing the workpiece from the workpiece handling assembly.

3. The workpiece handling assembly of claim 2, further including a housing for supporting the workpiece handling assembly therein.

4. The workpiece handling assembly of claim 3, wherein the frame includes:

a cylindrical upstanding side wall concentric therewith and surrounding the aperture; and a pair of shaft members diametrically secured to the side wall, said shaft members lying along the transverse axis and being rotatably secured in apertures within the housing.

5. The workpiece handling assembly of claim 4, further including first drive means coupled to at least one of the shaft members for driving the frame through an angle of 360° about the transverse axis.

6. The workpiece handling assembly of claim 5, wherein the first drive means indexably drives the frame in 90° increments relative to a plane perpendicular with the welding laser beam.

7. The workpiece handling assembly of claim 3, wherein the carrier includes a depending wall and a central aperture therein, said carrier being mounted in overlying planar relationship with the frame with the central aperture located concentrically with respect to the aperture in the frame.

8. The workpiece handling assembly of claim 7, further including second drive means for rotating the carrier through an angle of 360° about an axis concentric with the aperture in the frame.

9. The workpiece handling assembly of claim 8, wherein the second drive meand indexably drives the frame in 45° increments about an axis perpendicular to the transverse axis from a position where one side of the workpiece is parallel to said transverse axis and one side is perpendicular thereto.

10. The workpiece handling assembly of claim 8, further including opposed bearing means mounted to the frame for radially engaging the depending side wall of the carrier.

11. The workpiece handling assembly of claim 10, wherein the depending side wall of the carrier includes a beveled circumferential projection and the bearing means includes rollers having corresponding beveled surfaces for receiving the projection therein.

12. The workpiece handling assembly of claim 8, wherein the second drive means further includes a motor, a spur gear mounted to the carrier and concentric with the aperture in the frame, and a pinion driven by the motor engaging the spur gear for driving the carrier through an angle of 360° about the axis.

13. The workpiece handling assembly of claim 12, wherein the carrier includes indexing notches spaced at 90° intervals and a solenoid having a reciprocal core aligned for engaging the notches one at a time in order to secure the carrier against rotation when so engaged.

14. The workpiece handling assembly of claim 13, wherein said solenoid is mounted in the frame and the core is reciprocally aligned in a radial aperture in the upstanding wall for engaging the notches.

* * * * *